United States Patent [19]

Ehrlich

[11] Patent Number: 4,511,497
[45] Date of Patent: Apr. 16, 1985

[54] BUBBLE COMPOSITION USING MULTIPURPOSE SURFACTANT BASE

[75] Inventor: Joseph R. Ehrlich, New York, N.Y.

[73] Assignee: Strombecker Corporation, Chicago, Ill.

[21] Appl. No.: 536,881

[22] Filed: Sep. 28, 1983

Related U.S. Application Data

[63] Continuation of Ser. No. 320,518, Nov. 12, 1981, abandoned.

[51] Int. Cl.³ .......................... C11D 1/84; C11D 3/22
[52] U.S. Cl. ............................. 252/542; 252/174.17; 252/545; 252/548; 252/DIG. 14
[58] Field of Search ............ 252/174.17, 542, DIG. 2, 252/DIG. 13, DIG. 14, 548; 46/6

[56] References Cited

U.S. PATENT DOCUMENTS

| | | | |
|---|---|---|---|
| 3,231,582 | 1/1966 | Mannheimer et al. | 252/542 X |
| 3,359,275 | 12/1967 | Mannheimer | 252/542 X |
| 3,642,977 | 2/1972 | Hewitt | 424/70 |
| 4,294,728 | 10/1981 | Vanlerberghe et al. | 252/542 |

FOREIGN PATENT DOCUMENTS 640373  4/1962  Canada .

OTHER PUBLICATIONS

Bennett, H., "The Chemical Formulary", (Composition No. 4), vol. IX, 1951, Chemical Publishing Co., N.Y., pp. 567–568.

FC-102, Gel Shampoo, The Miranol Chemical Co., New Jersey, Product Bulletin.

*Primary Examiner*—Prince E. Willis
*Attorney, Agent, or Firm*—Hubbell, Cohen, Stiefel & Gross

[57] ABSTRACT

A bubble-forming composition, suitable for use as a child's toy, comprises an aqueous solution of a cellulose ether and a mono- or dicarboxylated imidazoline derivative of a fatty acid.

10 Claims, No Drawings

BUBBLE COMPOSITION USING MULTIPURPOSE SURFACTANT BASE

This is a continuation of application Ser. No. 320,518, filed Nov. 12, 1981, abandoned.

Soap bubbles are blown from water solutions comprising soap or another surfactant. A great variety of bubble solution formulations have been suggested to feature special effects in bubble making. There are solutions for making large bubbles, "long lasting" bubbles, deep colored bubbles, split bubbles, self-healing bubbles, multiple bubbles, vanishing bubbles, flaking bubbles, bursting bubbles, high and/or far-flying bubbles, sinking bubbles etc. In general, many anionic, non-ionic or amphoteric aqueous solutions with low surface tension lend themselves to bubble or foam-making when air or other gases are blown into such solutions.

Bubbles having a special feature as described above require the use of a particular surfactant, with or without modifying agents. No single bubble solution is known with which to obtain more than one or two special effects. Whatever the special effect, each such solution features a separate and different base surfactant upon which the solution is built.

All bubble solutions intended for use as a child's toy, must be non-toxic and non-irritating to skin and eyes before they can be marketed. Most of the published bubble formulations fail to meet this safety requirement.

To have one single safe surfactant base which would allow the formulator to make bubble solutions capable of exhibiting a variety of separate and different special effects, be it by quantitative manipulation and/or with the help of modifying additives, is a very desirable objective.

This invention deals with such a multi-purpose surfactant base. Using the surfactant base and the formulations as described in this specification, one can make:

A. Clear, bead-forming bubbles that cling to almost any horizontal, vertical or curved surface, and which do not break when touching a solid dry object. Such bubbles remain a complete sphere, adhering only on one single point, either on grass, leaves, wood, concrete paper, metal, glass or most plastics. Such beads can stay in that position for minutes or many hours without collapsing, depending on the formulation.

B. Long distance flying bubbles that withstand wind turbulence and even evade collisions.

C. A stream of floating bubbles, about 80 to 120 per puff of air using a simple straw, which float for several minutes.

D. A stream of vanishing bubbles, which disappear in 3 to 4 seconds. A pipe having several tubes can produce 300 to 400 or more vanishing bubbles that disappear within moments to create a most unusual effect. Such bubbles are dry to the touch, leave no visible trace and can be produced indoors.

E. A cloud of bubbles that change to tiny white, slowly sinking flakes that give the impression of a snowfall.

F. Bubbles that burst in air with a crackle.

G. A stream of "ghost bubbles".

H. Bubbles that dry in air and form hollow hulls.

The new surfactant base consists of a combination of two groups of chemicals, described as Group I and Group II, respectively.

Group I comprises aqueous solutions of hydroxypropyl methylcellulose and/or hydroxybutyl methylcellulose. These cellulose ethers contain methoxyl groups and either hydroxypropyl or hydroxybutyl groups. Hydroxypropyl methylcellulose is thus the mixed hydroxypropyl and methyl ether of cellulose, and hydroxybutyl methylcellulose is the mixed hydroxybutyl and methyl ether.

Useful Group I hydroxypropyl and hydroxybutyl methyl celluloses are water-soluble. Thus, a methoxy content of from about 15 to about 35%, preferably from about 20 to about 30%, by weight, and a hydroxypropoxyl or hydroxybutoxyl content of from about 2 to about 15%, preferably from about 4 to about 12%, by weight, will be suitable.

Also useful is hydroxypropyl cellulose, which is manufactured by reacting alkali cellulose with propylene oxide at elevated temperature. Typical molecular weights range from 60,000 to 1,000,000, and the material is water-soluble below 38° C. Hydroxypropyl cellulose is the 2-hydroxypropyl ether of cellulose.

Dow Chemical Company manufactures hydroxypropyl methylcellulose under the trade names METHOCEL HG, E, F, J, and K and hydroxybutyl methylcellulose under the trade name METHOCEL HB. Premium grades are purer and are generally preferred. Hercules Incorporated manufactures hydroxypropyl cellulose under their KLUCEL trademark.

The water soluble cellulose ethers of Group I differ from other water soluble film formers in two main respects which make them uniquely desirable as a base for bubble solutions. Water solutions of these cellulose ethers have considerable foaming properties by themselves; when air is blown into such solutions they form stiff bubbles. Due to their unusual solubility properties, these cellulose ethers are different in many respects from most other water soluble film formers. They are soluble in cold water and insoluble in hot water. Their water solutions, when heated, become cloudy and gel and/or precipitate; on cooling, the solutions are restored. The solutions also gel with increasing concentration.

Very thin layers of these water solutions release water from the films they form very quickly. The wall of a light weight bubble made from these solutions is an extremely thin layer. I have discovered that bubbles made from these cellulose ethers in their solution start drying in the air, when they are allowed to float for at least 15 to 20 seconds. The drying proceeds to a jelly or even to a dry state. When the bubbles have reached the state of a clear jelly, they are strong enough not to break on contact with solid surfaces. They maintain a complete spherical shape and settle down on any solid surface, whether horizontal, vertical or curved. They touch only on one single point and may stay there for up to many hours before they finally collapse. Though those bubbles or clear beads cling to a support, even in an upside-down position, they may bounce a few times before they come to a final landing. A child can catch such bubbles outdoors, e.g. with a plastic paddle (and some skill), and take them home; or he can line them up as in a shooting gallery and shoot them with a water pistol.

When such bubbles are formulated to dry beyond the jelly state, they form opaque, hollow hulls.

These two properties of the substituted cellulose ethers of Group I are most important properties of the new base material of the present invention. That they do not support bacterial growth and are non-toxic and non-irritating and compatible with a great variety of other materials, are additional helpful properties. The cellulose ethers are available in a wide variety of molecular weights and in various thermal gelation temperature ranges which influence their hardness of gel structure and the viscosities of the respective solutions. The available variety of the members of Group I, together with the variety of the members of Group II gives the formulator an almost unlimited latitude in preparing specialty bubble solutions.

Useful water-soluble cellulose ethers of Group I are commercially available from Dow Chemical Company under their "Methocel" trademark and from Hercules Incorporated under their "Klucel" trademark. The Examples employ the following cellulose ethers of Dow Chemical Company, all in the form of aqueous solutions:

Hydroxypropyl Methylcellulose

E 15-LV, E 50-LV, E 4M, all in the thermal gelation temperature range of 58° to 64° C.

F-50-LV, F-4M, all in the thermal gelation temperature range of 62°-68° C.

K-35-LV, K-100 LC, K-4M, K-15M, all in the thermal gelation temperature range of 70°-90° C.

60 HG-4M, 90 HG-15M All are Premium Grades.

Hydroxybutyl Methylcellulose

Methocel HB

The surfactants of Group II are mono- or dicarboxylated imidazoline derivatives of fatty acids of the formula II.

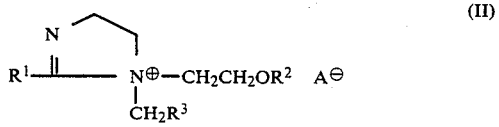

wherein:
R$^1$ is an alkyl or alkenyl group derived from a fatty acid;
R$^2$ is hydrogen, —CH$_2$COOM, —CH$_2$CH$_2$COOM or M;
R$^3$ is —COOM, —CH$_2$COOM or CHOHCH$_2$SO$_3$M;
M is hydrogen, alkali metal or ammonium; and
A is hydroxy, chloride or sulfate or surface active sulfonate or sulfate.

Preferred imidazoline surfactants have the formulas II-A or II-B

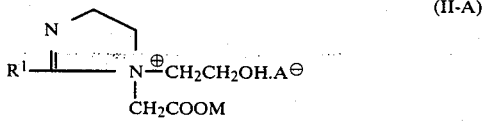

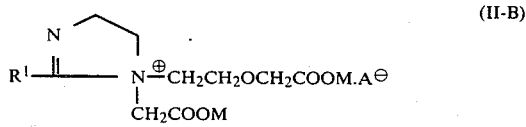

wherein R$^1$ and A are as defined above and M is hydrogen, sodium or ammonium. Preferably, R$^1$ is derived from a higher fatty acid of 6 to 20 carbon atoms, such as "cocoyl", stearyl, olelyl or lauryl. The term "cocoyl" is used in the art to mean a mixture of alkyl and alkenyl derived from coconut acid of 6 to 18 carbon atoms, but mainly of 10, 12 and 14 carbon atoms.

Useful surfactants of group II also include those compounds of formula II in which R$^3$ is —CHOHCH$_2$SO$_3$M, particularly those in which R$^1$ is cocoyl and lauryl. The lauryl and cocoyl derivatives tend to have a detoxifying effect and reduce the irritation effect of other components in the admixture.

Useful imidazoline surfactants employed in the Examples that follow include the following materials supplied by Miranol Chemical Company, Irvington, N.J.:

Trade Name: Miranol 2MCA

CTFA Designation, 1981—Cocoamphocarboxyglycinate (and) sodium lauryl sulfate (and) hexylene glycol.
Formula IIB; R$^1$ is cocoyl, M is sodium and A is lauryl sulfate.

Trade Name: Miranol MHT

CTFA Designation, 1981—Lauroamphoglycinate (and) Sodium Trideceth Sulfate.
Formula IIA; R$^1$ is lauryl, M is sodium and A is sulfate.

Trade Name: Miranol H2M Conc.

CTFA Designation, 1981—Lauroamphocarboxyglycinate.
Formula IIB; R$^1$ is lauryl, M is hydrogen, and A is OH.

Trade Name: Miranol C2M Conc.

CTFA Designation, 1981—Cocoamphocarboxyglycinate.
Formula IIB; R$^1$ is cocoyl, M is hydrogen and A is OH.

Trade Name: Miranol SM Conc.

CTFA Designation, 1981—Caproamphoglycinate.
Formula IIA; R$^1$ is decanyl

Trade name: Miranol 2 MCAS modified

CTFA Designation, 1981—Cocoamphocarboxyglycinate (and) Sodium lauryl sulfate (and) Sodium Laureth Sulfate (and) propylene glycol.
Formula IIB; A mixture of compounds wherein R$^1$ is cocoyl, M is sodium and A is lauryl sulfate or laureth-3-sulfate.

Trade Name: Miranol S2M Conc.

CTFA Designation, 1981—Caproamphocarboxyglycinate.

Trade Name: Miranol CS Conc.

Formula II; R$^1$ is cocoyl, R$^2$ is H, R$^3$ is CHOHCH$_2$SO$_3$Na and A is OH.

Trade Name: Miranol HS Conc.

Formula II; R$^1$ is lauryl, R$^2$, R$^3$ and A as in Miranol CS.

All of the Group II surfactants are non-toxic and non-irritating to the skin and eyes. Some of them even have detoxifying properties in admixture with other materials which by themselves might be irritants. They reduce or eliminate irritation, even eye sting. None of the imidazoline derivatives alone, nor the cellulose ethers, can produce such potent bubble solutions as their mixtures together. Together they have a synergistic action.

The quantities of the members of Groups I and II in the bubble solutions, and eventually other additives, determine the final character of the various specialty solutions.

Examples of useful additives are glycerine, propylene glycol, sodium lauryl sulfate in small quantities, fatty acid alkanolamides, succinates and many more are possible. The ratios of the members of the Groups I and II to one another are within wide limits, as may be the ratios of fatty acid alkanolamides, when used, to Group II members.

Generally speaking, the cellulose ethers of Group I is present in an amount of from about 0.1% to about 5%, preferably about 0.2% to about 4%, most preferably about 0.5% to about 3% by weight. The amount of the Group II imidazoline surfactant is from about 0.8 to about 15% preferably from about 2% to about 8%, most preferably from about 3% to about 6%, by weight. In general, as the amount of the cellulose ether increases, the viscosity of the solution also increases. Hence, it may be desirable to use lower molecular weight cellulose ethers when using more than about 40% of the cellulose ether solution. With respect to the imidazoline surfactant, there is no advantage in using more than is effective. Hence, while more than about 15%, or even up to about 8% will generally produce the desired effect.

The other additives may include:
0 to about 10%, preferably up to about 5.5% fatty acid alkanolamide;
0 to about 40%, preferably up to about 30% glycerin;
0 to about 30%, preferably up to about 15% propyleneglycol; and
0 to about 2%, preferably up to about 1% sodium lauryl sulfate.

It is preferred to prepare the bubble compositions of the invention by first preparing an aqueous solution of the Group I cellulose ethers and then adding the remaining materials. It is not possible to dissolve the members of Group I in cold water or cold aqueous solutions, nor can one heat such solutions because of foaming and precipitation of the ethers. Aqueous solutions of Group I cellulose ethers are made by heating to about 90° C. about 40% of the water needed for the solution and then adding the cellulose slowly in small portions, using vigorous agitation to completely disperse the cellulose ether. The heating is stopped and rapid cooling follows by adding crushed ice to complete the amount of water. Continued vigorous agitation will result in complete solution of the cellulose ether. It is advisable not to exceed a temperature of 90° C. to avoid the formation of steam bubbles which would cause hard and persistent foam in the final solution. As mentioned earlier, those substituted ethers have bubble forming properties. Even without steam bubbles, it is necessary to let the finished solution stand for 24 hours or longer, to allow the entrapped air to escape. Some of these solutions are quite viscous.

The present invention is illustrated by the following examples. Throughout the specification and claims, all parts and proportions are by weight, unless otherwise stated. The designation "p/w" means parts by weight.

EXAMPLE 1

| | |
|---|---|
| 15.0 | p/w Miranol 2MCA (47% active ingredients) |
| 85.0 | p/w 0.75% methyl hydroxy butyl cellulose ether 7.68% solids |
| 100.0 | |

This clear solution is not a "specialty" bubble solution, but a regular bubble solution. It comprises only two ingredients. A water solution of the lauric sulfate of a dicarboxymethylated derivative of cocoimidazoline, and a water solution of a methylcellulose ether with part of its methyl groups being substituted by hydroxybutoxyl.

Using a conventional "wand", one can make about 20 well-sized bubbles (as with commercial bubble solutions) with one puff of air, the bubbles having various diameters of 2 to 3 inches or more. This result cannot be achieved by using the aqueous solution of Miranol 2MCA alone or by using the solution of the hydroxybutyl methylcellulose ether alone. Nor can this result be obtained by replacing the cellulose ether solution with water in the above formula.

Example 1 is given to demonstrate the fact that these two ingredients provide a bubble solution base by synergistic action. Other Examples will illustrate how such base formulations can be transformed into a range of "specialty" solutions using additives and/or exchanging either the butylated ether by propylated ether or the Miranol 2MCA by other imidazoline derivatives or both or by making changes in the quantities of the ingredients.

EXAMPLE 2

15.0 p/w Miranol 2MCA.
85.0 p/w 2% solution of Hydroxy propylmethyl cellulose ether 60 HG.

With this solution one can make about 30 colored bubbles which turn into flakes. 8.75% solids.

EXAMPLE 3

Exchanging the imidazoline derivative in Example 1, e.g. by using Miranol MHT (34.5% active), gives a solution with which one can produce about 50 to 80 quickly disappearing bubbles. 7.68% solids.

Still using only two basic ingredients of Examples 1 to 3 but shifting quantities will give solutions which show some "specialty effects".

EXAMPLE 4

50.0 p/w of 0.75% hydroxy butylmethyl cellulose solution
50.0 p/w Miranol MHT.  17.62% solids.

With this solution one can produce 50 to 60 floating bubbles with one puff of air, lasting about 20 seconds.

EXAMPLE 5

30.0 p/w Miranol 2MCA
70 p/w 1% 90-HG Hydroxy propylmethyl cellulose ether.  14.8% solids.

With this solution one can produce 40 to 50 bubbles, changing to flakes.

However, the foregoing Examples, because of cost, performance and other considerations are not as practical as compared with other solutions of this nature, using additives and other combinations as will be illustrated by the next Examples. Examples for bead-forming solutions:

EXAMPLE 6

1.5 p/w lauric acid 1:1 diethanolamide.
12.0 p/w Miranol 2MCA.
70.0 p/w 4% solution E-50-LV hydroxy propylmethyl cellulose (50 cps).
13.0 p/w glycerin.
3.5 p/w water.   9.94% solids.

With this solution one can make long-floating bubbles which, when allowed to float at least for 15 to 20 seconds, will eventually settle down on the ground or cling to other solid objects without breaking. Such bubbles form transparent, completely spherical beads which cling to solid objects just with one single point of their surface and can stay there for many hours before collapsing to a jelly mass.

EXAMPLE 7

12.0 p/w Miranol 2MCA.
73.0 p/w 4% K-35-LV hydroxy propylmethyl cellulose (35 cps).**
15.0 p/w glycerin.

With this solution one can produce bubbles which behave like those described in Example 6.   8.56% solids.

**The viscosity information refers to 2% aqueous solution at 20° C.

EXAMPLE 8

12.0 p/w Miranol 2MCA.
40.0 p/w 2% 60 HG (4000 cps) hydroxy propyl methylcellulose.
13.0 p/w 1.5% HB hydroxy butylmethylcellulose ether (12,000 cps).
20.0 p/w 0.75% HB hydroxy butylmethylcellulose ether (12,000 cps).
15.0 glycerin.

This solution, likewise, is bead-forming.   8.64% solids.

EXAMPLE 9

1.5 p/w lauric acid diethanolamide.
10.0 p/w Miranol 2MCA.
61.0 p/w 4% E-50-LV hydroxy propylmethyl cellulose ether.
12.0 p/w glycerin.
15.5 p/w water.

Bead-forming liquid.   8.64% solids.

EXAMPLE 10

10.0 p/w Miranol 2MCA.
30.0 p/w glycerin.
40.0 p/w 2% F-4M cellulose ether solution.
20.0 p/w water.   5.5% solids This solution yields deep-colored, very far- and long-flying bubbles with one-half inch tubes.

EXAMPLE 11

12.0 p/w Miranol CS (Sulfonate).
13.0 p/w glycerin.
75.0 p/w 1% solution of 90HG hydroxy propylmethylcellulose.

Bead-forming liquid.   6.75% solids.

EXAMPLE 12

20.0 p/w Miranol MHT.
20.0 p/w hydroxy butylmethylcellulose HB—0.75%.
30.0 p/w 1% solution 90HG Premium.
30.0 p/w glycerin.

Bead-forming liquid.   7.45% solids.

In many instances the cellulose ethers as well as the imidazoline derivatives are interchangeable with other members of their respective groups within the same formulation, sometimes with small quantitive corrections but without changing the character of the specific "specialty" solution. Examples 6–12 are just a few of such possibilities. All of Examples 6–12 represent bead-forming solutions. When such interchanges are made, the result might sometimes change in the sense that the number of beads or their life time might be different, the latter ranging from minutes to hours, mostly hours. For example, beads obtained with the solution of Example 6 have been observed to stay up to 36 hours before collapsing. Such beads may be caught in the air with plastic, wooden or cardboard paddles on which they can be carried around, or they can be lined up to form a shooting gallery to be shot at with water pistols. This gives a new valuable play value to the old bubble toy.

What has been said about interchangeability of the members of Groups I and II, is also true for the formulation of other "specialty" solutions in the Examples which will follow. However, there is no interchangeability for additives to the base materials of Group I and II without changing the character of such "specialty" solutions.

EXAMPLE 13

7.7 p/w Miranol MHT (35.5% active).
16.0 p/w 2% 60G solution.
4.0 p/w glycerin.
5.4 p/w lauric diethanolamide.
66.9 p/w water.   8.45% solids.

With this solution, using a 4 mm diameter straw, one can produce with one puff of air 80 to 110 very long floating bubbles.

EXAMPLE 14

A similar result can be obtained by exchanging in Example 13, the 7.7 p/w MHT with 5.7 p/w Miranol 2MCA (47% active) and adding 0.6 p/w sodium lauric sulfate, the water content to be adjusted to 68.1 p.w. 9.0% solids.

In some combinations of members of Group I and Group II, as in the above case, the presence of a little sodium lauryl sulfate is desirable to improve the appearance of the solutions, helping them to stay clear.

EXAMPLE 15

5.7 p/w Miranol 2MCA.
10.0 p/w 4% E-50-LV solution.
4.0 p/w glycerin.
4.0 p/w lauric diethanolamide.
0.5 p/w sodium lauryl sulfate.
75.8 p/w water.   7.7% solids.

One puff of air produces 90 to 110 long floating beautifully colored bubbles turning to ghost bubbles.

EXAMPLE 16

5.0 p/w Miranol C2M.
37.0 p/w 2% 60 HG solution.
3.0 p/w glycerin.
5.0 p/w lauric diethanolamide.
50.0 water.   8.24% solids.

100 and 120 very long floating beautifully colored bubbles turning to ghost bubbles.

EXAMPLE 17

Exchange in Example 16 Miranol C2M with Miranol SM and get a similar result.

EXAMPLE 18

5.0 p/w Miranol CS.
16.0 p/w 2% 60 HG solution.
8.0 p/w glycerin.
5.0 p/w lauric diethanolamide.
0.4 p/w lauryl sodium sulfate.
65.6 water.

About 90 colored, floating bubbles.   7.72% solids.

EXAMPLE 19

5.3 p/w Miranol 2MCA.
26.5 p/w 0.75% HB solution.
10.0 p/w glycerin.
5.0 p/w lauric diethanolamide.
0.6 p/w sodium lauryl sulfate.
52.0 p/w water 100 to 120 colored bubbles.   8.29% solids.

EXAMPLE 20

4.8 p/w Miranol 2MCA.
45.0 p/w 4% E-50-LV solution.
14.0 p/w 5% E-15-LV solution.
5.0 p/w glycerin.
0.8 p/w sodium lauryl sulfate.
4.5 p/w lauric diethanolamide.
25.9 p/w water.   10.05% solids.

The bubbles formed by this solution exhibit a strange show. When drifting towards a wall, trees or going down towards the ground, they come very close, about one inch, then they change direction and float along a wall upwards or sidewards or float just above the floor or go around a tree, always avoiding collision at the last moment. Only a very few might collide and change to a flake.

EXAMPLE 21

20.0 p/w Miranol MHT.
50.0 p/w 1% 90 HG solution.
15.0 p/w glycerin.
15.0 p/w propylene glycol.   7.5% solids.

One would expect this formula would yield a bead-forming solution, but the presence of the propylene glycol changes this solution to one which yields 80 to 90 beautifully deep colored bubbles, and no beads.

EXAMPLE 22

12.0 p/w Miranol 2MCA.
7.30 p/w 1% 90 HG solution.
15.0 p/w glycerin.   6.39% solids.

This solution yields about 30 to 40 colored bubbles, most of them forming long-lasting beads or, when wind-driven being long distance bubbles; some turning into big flakes.

EXAMPLE 23

A somewhat similar result may be obtained by using a 3%-K-100 solution in place of 1% 90 HG solution in Example 22. This gives a perfect bead-forming solution. 7.85% solids.

EXAMPLE 24

Likewise, using a 2% 60 HG solution in Example 22 in place of the 1% 90 HG solution gives a similar result. 7.1% solids.

EXAMPLE 25

12.0 p/w Miranol MHT.
49.0 p/w 2% 60 HG solution.
24.0 p/w 4% K-100-LV solution.
15.0 p/w glycerin.   7.58% solids.

This very viscous solution yields beads which hover long over the floor before touching it.

EXAMPLE 26

20.0 p/w Miranol MHT.
50.0 p/w 1% 90 HG solution.
30.0 p/w glycerin.   7.5% solids.

About 80 colored, very long floating bead-forming bubbles.

EXAMPLE 27

5.4 p/w Miranol 2MCA.
16.0 p/w 1% 90 HG solution.
9.0 p/w propylene Glycol.
5.0 p/w lauric diethanolamide.
0.8 p/w sodium lauryl sulfate.
63.8 p/w water.   8.49% solids.

By using a multiple head pipe as described in U.S. Pat. No. 4,246,717, one can produce with one puff of air a cloud of several hundreds of bubbles which completely and tracelessly disappear within four seconds. This is not only a wierd effect, but also makes indoor use possible; they also crackle.

EXAMPLE 28

5.74 p/w Miranol 2MCA.
16.0 p/w 2% 60 HG solution.
8.0 p/w propylene glycol.
5.4 p/w lauric diethanolamide.
0.8 p/w sodium lauryl sulfate.
64.06 p/w water.   9.21% solids.

100–120 colored bubbles with a single straw which disappear within four seconds. Similar to Example 27.

EXAMPLE 29

Replace the propylene glycol in Example 28 by an equal amount of glycerin and a similar cloud of bubbles will not quickly disappear, but float around for a long time.

EXAMPLE 30

14.0 p/w Miranol 2MCA.

65.0 p/w 1% 90 HG solution.
20.0 p/w glycerin.
1.0 p/w lauric diethanolamide.   8.23% solids.

This solution lends itself to the formation of beads and long distance flying bubbles.

EXAMPLE 31

Replace in Example 30 the 20 p/w glycerin by 10 p/w glycerin plus 10 p/w propylene glycol. This changes the solution to one which yields even more immediately disappearing, yet colorless bubbles than described in Example 28.

EXAMPLE 32

5.5 p/w Miranol 2MCA.
44.5 p/w 4% E-50-LV solution.
2.0 p/w glycerin.
5.1 p/w lauric diethanolamide.
0.7 p/w sodium lauryl sulfate.
42.2 p/w water.   10.16% solids.

100 to 120 bubbles, disappearing in four seconds.

EXAMPLE 33

Replace in Example 32 2 p/w water with 2 p/w glycerin and obtain 100 to 120 long floating colored bubbles.

EXAMPLE 34

0.90 p/w Miranol C2M.
1.10 p/w Miranol SM.
1.90 p/w Miranol 2MCA.
0.90 p/w Miranol MHT.
1.50 p/w Standapol SH-100 (Na$_2$ Monooleamido Sulfosuccinate 30%).
15.00 p/w 2% 60 HG solution.
4.00 p/w glycerin.
2.00 p/w propylene glycol.
5.50 p/w lauric diethanolamide.
0.50 p/w sodium lauryl sulfate.
66.70 p/w water.   9.0 solids.

Yields 80 to 90 long floating bubbles.

EXAMPLE 35

12.0 p/w Miranol 2MCA.
86.5 p/w 2% 60 HG or 1% 90 HG solution.
1.5 p/w lauric diethanolamide.   8.15% solids.

Solution yields 60 to 80 colored bubbles which change to slowly sinking white flakes. With multiple head pipe, it looks like light snowing.

EXAMPLE 36

10.0 p/w Miranol 2MCA.
50.0 p/w 60 HG solution 2%.
37.8 p/w 4% E-50-LV solution.
2.2 p/w lauric diethanolamide.   8.91% solids.

Same performance as in Example 35.

EXAMPLE 37

7.0 p/w Miranol 2MCA.
45.0 p/w 2% 60 HG solution.
45.0 p/w 4% E-5-LV solution.
3.0 p/w lauric diethanolamide.   8.95% solids.

This solution yields 100 to 120 colored bubbles which burst with a light crackle and fall down in white flakes.

EXAMPLE 38

4.8 p/w Miranol 2MCA.
4.0 p/w 4% E-50-LV solution.
20.0 p/w 5% E-15-LV solution.
3.8 p/w glycerin.
4.5 p/w lauric diethanolamide.
0.6 p/w sodium lauryl sulfate.
26.3 p/w water.   9.95% solids.

About 80 bubbles turning totaly to thin flakes.

When it is desirable to obtain mainly a large number of bubbles with this type of bubble liquid, the addition of fatty acid alkanolamides has shown to be helpful, though not absolutely necessary. In the Examples, lauric acid 1:1 diethaolamide was used, however, other fatty acid diethanolamides can also be used. It is known that when fatty acid alkanolamides are used for that purpose, their effectiveness depends a great deal on proper ratios with respect to other surfactants in the formula. It was found that this rule does not apply to the members of Group II of these bubble bases. An entire line of different ratios of lauric acid diethanolamide to various water-free members of Group II in the formulations was tested with the result that there was no basic difference in the performance among such tested solutions with ratios ranging from 0.07:1 to 4:1. However, the solids content of the various solutions, in particular the concentration of the fatty acid alkanolamide has an influence on the behavior of the various specialty solutions, making solutions with lower concentration working less spectacularly, though still yielding good bubble solutions. As an example:

EXAMPLE 39

2.12 p/w Miranol 2MCA.
18.0 p/w 2% 60 HG solution.
2.0 p/w lauric acid diethanolamide.
4.0 p/w glycerin.
0.8 p/w sodium lauryl sulfate.
73.08 p/w water.   4.1% solids.

With this solution, one can produce about 50 colored, floating bubbles.

EXAMPLE 40

6.0 p/w Miranol 2MCA.
18.0 p/w 2% 60 HG solution.
0.2 p/w lauric acid diethanolamide.
4.0 p/w glycerin.
71.8 p/w water.   3.36% solids.

This solution yields about 20 colored bubbles, some of them floating 40 to 50 seconds; this solution has also a ratio of 0.07:1 (see above).

The Examples in this specification are a selection from many hundreds of experiments which have been made. They all indicate that with relatively few and simple modifications (additives and/or quantitative changes) to the basic materials of Groups I and II, astonishing and completely different effects can be achieved. The described solutions come in all grades of viscosities, from low to quite high.

EXAMPLE 41

12.0 p/w Miranol 2MCA.

15.0 p/w glycerin.
73.0 p/w 5% E-15-LV solution.  9.29% solids.

This solution does not produce many bubbles, but some of them form opaque, solid balls.

EXAMPLE 42

12.0 p/w Miranol 2MCA.
73.0 p/w 4% E-50-LV solution.
15.0 p/w glycerin.  8.56% solids.

More bubbles can be produced than with Example 41, and when those are being kept floating for 30 to 40 seconds, they form beads up to one inch in diameter and many of them are still complete beads after 12 hours; this solution can take considerable dilution with water without changing properties. (e.g. 15 p/w water). By adding some lauric diethanolamide to a water-diluted solution of Example 42, one arrives at the formula of Example 43.

EXAMPLE 43

10.0 p/w/Miranol 2MCA.
62.4 p/w 2% E-50-LV solution.
11.8 p/w glycerin.
1.0 p/w lauric acid diethanolamide.
14.8 p/w water.  6.94% solids.

This solution forms 40 to 60 bubbles, most of them being long-lasting beads.

EXAMPLE 44

4.8 p/w Miranol 2MCA.
56.0 p/w 4% E-50-LV solution.
13.7 p/w 5% E-15-LV solution.
5.0 p/w glycerin.
4.5 p/w lauric acid diethanolamide.
15.0 p/w water.
1.0 p/w sodium lauryl sulfate.  10.68% solids.

Giving a cloud of bubbles turning into a storm of "snow" flakes.

EXAMPLE 45

4.8 p/w Miranol 2MCA.
0.8 p/w sodium lauryl sulfate.
60.0 p/w 4% E-50-LV solution.
30.0 p/w 2% F-4M hydroxypropyl methylcellulose solution in water.
4.4 p/w lauric alkanolamide.  9.65% solids.

About 80 bubbles made with this solution with one puff disappear in three seconds without leaving any wet spots on the floor. The bubbles change to very small translucent flakes which are hardly visible in the air and not visible at all on the floor. This solution can be used indoors.

What is claimed:

1. A bubble-forming composition, which consists essentially of an aqueous solution consisting essentially of from about 0.1 to about 5% by weight of a cellulose ether selected from the group consisting of hydroxypropyl methylcellulose and hydroxybutyl methylcellulose and mixtures thereof and from about 0.8 to about 15% by weight of an imidazoline surfactant of formula II:

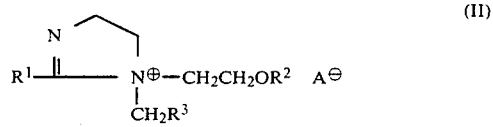

wherein:
R$^1$ is an alkyl or alkenyl group derived from a fatty acid;
R$^2$ is hydrogen, —CH$_2$COOM, —CH$_2$CH$_2$COOM or M;
R$^3$ is —COOM, —CH$_2$COOM or CHOHCH$_2$SO$_3$M;
M is hydrogen, alkali metal or ammonium; and
A is hydroxy, chloride or sulfate or surface active sulfonate or sulfate.

2. The composition according to claim 1, wherein said cellulose ether is a hydroxypropyl or hydroxybutyl methyl cellulose.

3. The composition according to claim 2, wherein cellulose ether has a methoxy content of from about 15 to about 35% by weight, and a hydroxypropoxyl or hydroxybutoxyl content of from about 2 to about 15% by weight.

4. The composition according to claim 1, wherein the cellulose ether is present in an amount of from about 0.5% to about 2.0% by weight.

5. The composition according to claim 2, wherein R$^1$ is of 6 to 20 carbon atoms.

6. The composition according to claim 5, wherein R$^1$ is cocoyl, stearyl, olelyl, lauryl or capryl.

7. The composition according to claim 2, wherein said imidazoline comprises cocoamphocarboxyglycinate, lauroamphoglycinate, caproamphoglycinate, or lauroamphocarboxyglycinate.

8. The composition according to claim 2, wherein R$_2$ is hydrogen, R$^3$ is CHOHCH$_2$SO$_3$Na, A is OH and R$^1$ is cocoyl or lauryl.

9. The composition according to claim 5, wherein said ether is present in an amount of from about 0.1 to about 4% and imidazoline surfactant is present in an amount of from about 0.8 to about 8% by weight.

10. The composition according to claim 1, wherein there is also present at least one additive selected from the group consisting of
0 to about 10% fatty acid alkanolamide;
0 to about 40% glycerin;
0 to about 30% propyleneglycol; and
0 to about 2% sodium lauryl sulfate;
all by weight.

* * * * *

UNITED STATES PATENT AND TRADEMARK OFFICE
CERTIFICATE OF CORRECTION

PATENT NO. : 4,511,497
DATED : April 16, 1985
INVENTOR(S) : Joseph R. Ehrlich

It is certified that error appears in the above-identified patent and that said Letters Patent is hereby corrected as shown below:

On the title page :

Assignee should read --Jack Wachtel, Larchmont, New York
                                                part interest--.

*Signed and Sealed this*

*Nineteenth* Day of *November 1985*

[SEAL]

*Attest:*

DONALD J. QUIGG

*Attesting Officer*      *Commissioner of Patents and Trademarks*